(12) United States Patent
Kum et al.

(10) Patent No.: US 11,858,535 B2
(45) Date of Patent: Jan. 2, 2024

(54) ELECTRONIC DEVICE FOR PREDICTION USING RECURSIVE STRUCTURE AND OPERATING METHOD THEREOF

(71) Applicant: Korea Advanced Institute of Science and Technology, Daejeon (KR)

(72) Inventors: Dongsuk Kum, Daejeon (KR); Sanmin Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 374 days.

(21) Appl. No.: 17/121,829

(22) Filed: Dec. 15, 2020

(65) Prior Publication Data

US 2021/0316762 A1  Oct. 14, 2021

(30) Foreign Application Priority Data

Apr. 13, 2020  (KR) .......... 10-2020-0044712

(51) Int. Cl.
*B60W 60/00* (2020.01)
*G06T 7/20* (2017.01)
*G05B 13/02* (2006.01)
*G06N 3/044* (2023.01)
(Continued)

(52) U.S. Cl.
CPC ....... *B60W 60/0027* (2020.02); *G05B 13/027* (2013.01); *G06N 3/044* (2023.01); *G06N 3/045* (2023.01); *G06T 7/20* (2013.01); *B60W 2554/4044* (2020.02); *G05D 1/0088* (2013.01); *G06T 2207/20084* (2013.01);
(Continued)

(58) Field of Classification Search
CPC ...... B60W 60/0027; B60W 2554/4044; G06N 3/045; G06N 3/044; G05B 13/027; G06T 7/20; G06T 2207/20084; G06T 2207/30236; G06T 2207/30241; G06T 2207/30252; G05D 1/0088
See application file for complete search history.

(56) References Cited

U.S. PATENT DOCUMENTS

2019/0265082 A1\* 8/2019 Zafar ............... H04Q 9/00
2019/0287012 A1 9/2019 Celikyilmaz et al.
2019/0340496 A1\* 11/2019 Kim ............... G06N 3/045
(Continued)

FOREIGN PATENT DOCUMENTS

KR  101951595 B1  2/2019

*Primary Examiner* — Behrang Badii
*Assistant Examiner* — Jay Khandpur
(74) *Attorney, Agent, or Firm* — PCFB LLC

(57) ABSTRACT

An electronic device and an operating method thereof may be configured to detect input data having a first time interval, detect first prediction data having a second time interval based on the input data using a preset recursive network, and detect second prediction data having a third time interval based on the input data and the first prediction data using the recursive network. The recursive network may include an encoder configured to detect each of a plurality of feature vectors based on at least one of the input data or the first prediction data, an attention module configured to calculate each of pieces of importance of the feature vectors by calculating the importance of each feature vector, and a decoder configured to output at least one of the first prediction data or the second prediction data using the feature vectors based on the pieces of importance.

14 Claims, 12 Drawing Sheets

(51) Int. Cl.
*G06N 3/045* (2023.01)
*G05D 1/00* (2006.01)

(52) U.S. Cl.
CPC .............. *G06T 2207/30236* (2013.01); *G06T 2207/30241* (2013.01); *G06T 2207/30252* (2013.01)

(56) References Cited

U.S. PATENT DOCUMENTS

| | | | |
|---|---|---|---|
| 2020/0327884 A1* | 10/2020 | Bui | G06N 3/08 |
| 2021/0143840 A1* | 5/2021 | Luo | G06N 3/045 |
| 2021/0171025 A1* | 6/2021 | Ishikawa | G06N 3/08 |
| 2021/0181749 A1* | 6/2021 | Pan | G06N 3/045 |
| 2021/0295171 A1* | 9/2021 | Kamenev | G06T 7/70 |
| 2022/0139092 A1* | 5/2022 | Hashimoto | G06N 3/045 |
| | | | 382/156 |
| 2022/0141503 A1* | 5/2022 | Cui | G06V 10/82 |
| | | | 725/19 |
| 2022/0227379 A1* | 7/2022 | Robinson | B60W 40/02 |

* cited by examiner

FIG. 2
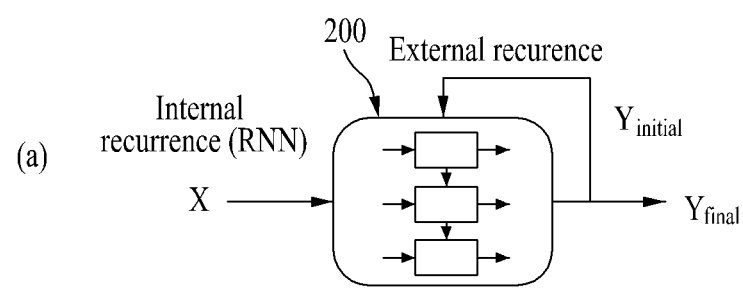
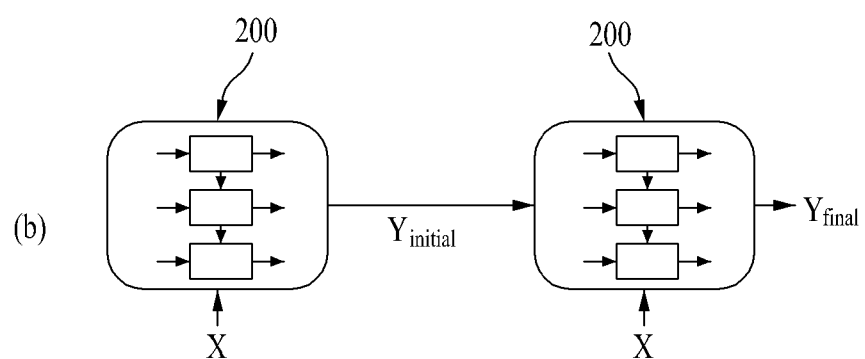

ELECTRONIC DEVICE FOR PREDICTION USING RECURSIVE STRUCTURE AND OPERATING METHOD THEREOF

CROSS-REFERENCES TO RELATED APPLICATIONS

This application is based on and claims priority under 35 U.S.C. 119 to Korean Patent Application No. 10-10-2020-0044712, filed on Apr. 13, 2020 in the Korean intellectual property office, the disclosures of which are herein incorporated by reference in their entireties.

TECHNICAL FIELD

Various embodiments relate to an electronic device for prediction using a recursive structure and an operating method thereof.

BACKGROUND OF THE INVENTION

Recently, as an autonomous vehicle is actively researched, a vehicle movement prediction technique, that is, a technique essential for the safe driving of a vehicle, has been in the spotlight. However, the existing movement prediction technique for a surrounding vehicle degrades overall reliability of an autonomous driving technique due to an accident occurring in the autonomous vehicle attributable to erroneous prediction. Such erroneous prediction occurs because a future movement is predicted using only simple past information. Past information includes information on which the future may be predicted to some degree, but it is difficult to infer future movements of drivers based on only past information simply because the drivers drive while predicting future situations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device capable of predicting a movement of a surrounding vehicle by using future information not yet occurred in addition to past information, and an operating method thereof.

According to various embodiments, an operating method of an electronic device may include detecting input data having a first time interval, detecting first prediction data having a second time interval based on the input data using a preset recursive network, and detecting second prediction data having a third time interval based on the input data and the first prediction data using the recursive network.

According to various embodiments, an electronic device includes a memory and a processor connected to the memory and configured to execute at least one instruction stored in the memory. The processor may be configured to detect input data having a first time interval, detect first prediction data having a second time interval based on the input data using a preset recursive network, and detect second prediction data having a third time interval based on the input data and the first prediction data using the recursive network.

According to various embodiments, a computer program stored in a storage medium coupled to a computer device and readable by the computer device may execute an operation of detecting input data having a first time interval, an operation of detecting first prediction data having a second time interval based on the input data using a preset recursive network, and an operation of detecting second prediction data having a third time interval based on the input data and the first prediction data using the recursive network.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a diagram for describing operational characteristics of a recursive network according to various embodiments.

DETAILED DESCRIPTION

While illustrative embodiments have been illustrated and described, it will be appreciated that various changes can be made therein without departing from the spirit and scope of the invention.

Hereinafter, various embodiments of this document are described in detail with reference to the accompanying drawings.

Figure 1:
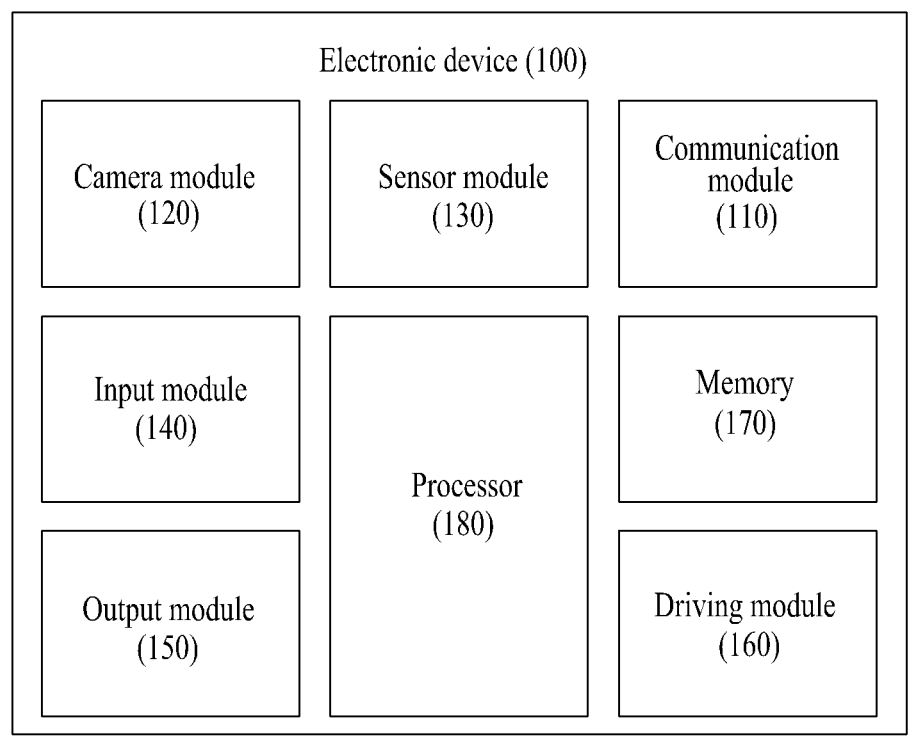
FIG. 1 is a diagram illustrating an electronic device according to various embodiments.
Figure 3:
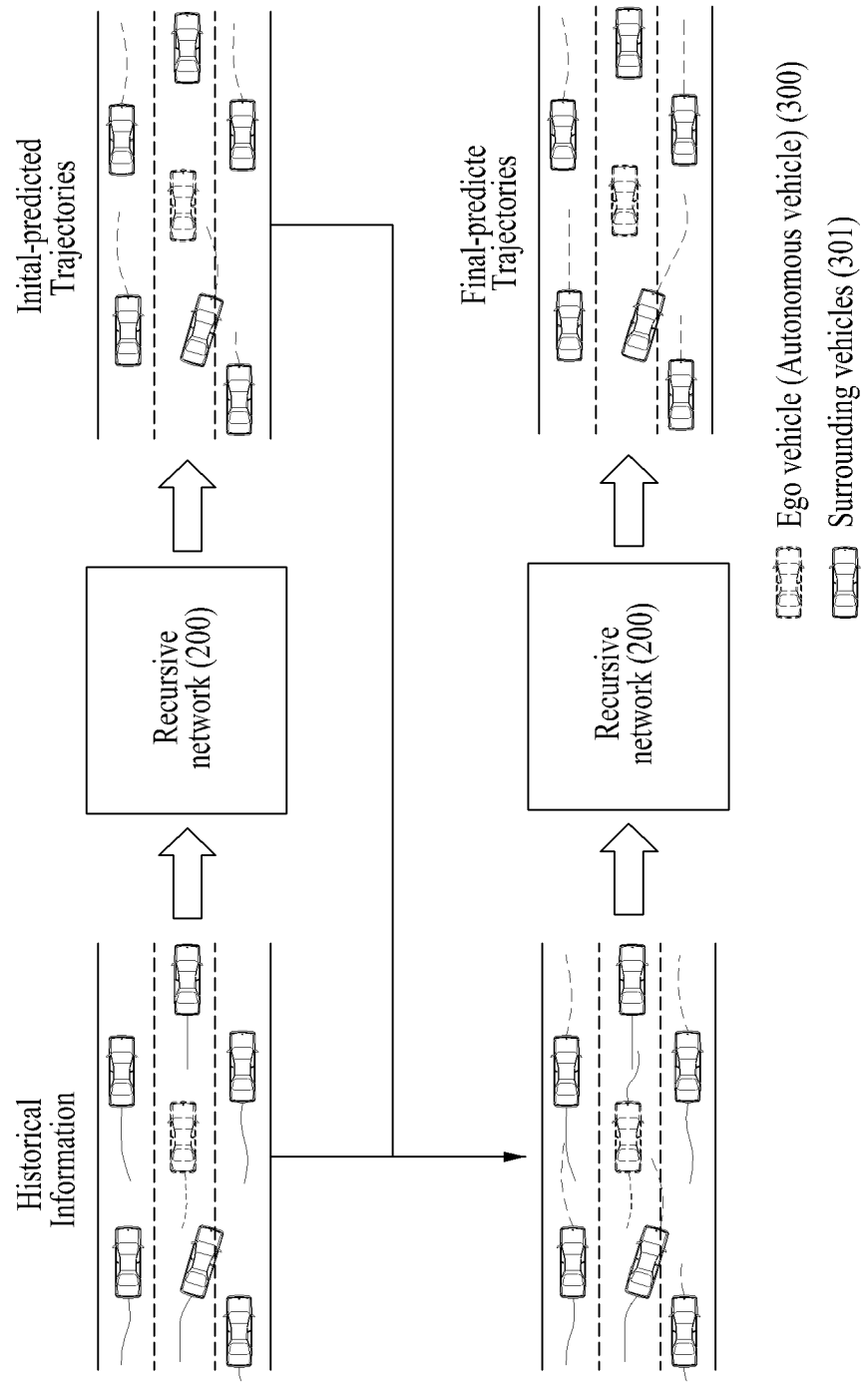
FIG. 3 is a diagram for describing illustrative operational characteristics of the recursive network.

FIG. 1 is a diagram illustrating an electronic device 100 according to various embodiments. FIG. 2 is a diagram for describing operational characteristics of a recursive network 200 according to various embodiments. FIG. 3 is a diagram for describing illustrative operational characteristics of the recursive network 200.

Referring to FIG. 1, the electronic device 100 according to various embodiments may include at least one of a communication module 110, a camera module 120, a sensor module 130, an input module 140, an output module 150, a driving module 160, a memory 170 or a processor 180. In an embodiment, at least any one of the components of the electronic device 100 may be omitted or one or more other components may be added to the electronic device 100.

The communication module 110 may support communication between the electronic device 100 and an external device (not illustrated). In this case, the communication module 110 may include at least any one of a wireless communication module or a wired communication module. According to one embodiment, the wireless communication module may support at least any one of a long-distance communication method or a short-distance communication method. The short-distance communication method may include at least any one of Bluetooth, WiFi direct, or infrared data association (IrDA), for example. In the wireless communication method, communication may be performed using the long-distance communication method over a network. The network may include at least any one of computer networks, such as a cellular network, the Internet, a local area network (LAN) or a wide area network (WAN). According to another embodiment, the wireless communication module may support communication with a global navigation satellite system (GNSS). For example, the GNSS may include a global positioning system (GPS).

The camera module 120 may capture an external image of the electronic device 100. In this case, the camera module 120 may be installed at a predetermined location of the electronic device 100, and may capture an external image. Furthermore, the camera module 120 may generate image data for an external image of the electronic device 100. For example, the camera module 120 may include at least any one of a lens, at least one image sensor, an image signal processor or a flash.

The sensor module 130 may detect a state of the electronic device 100 or an external environment of the electronic device 100. Furthermore, the sensor module 130 may generate sensing data for the state of the electronic device 100 or the external environment of the electronic device 100. For example, the sensor module 130 may include at least any one of an acceleration sensor, a gyroscope sensor, an image sensor, a RADAR sensor, a LiDAR sensor or an ultrasonic sensor.

The input module 140 may receive, from the outside of the electronic device 100, an instruction or data to be used for at least any one of the components of the electronic device 100. For example, the input module 140 may include at least any one of a microphone, a mouse or a keyboard. In an embodiment, the input module may include at least any one of a touch circuitry configured to detect a touch or a sensor circuitry configured to measure the intensity of a force generated by a touch.

The output module 150 may provide information to the outside of the electronic device 100. In this case, the output module 150 may include at least any one of a display module or an audio module. The display module may visually output information. For example, the display module may include at least any one of a display, a hologram device, or a projector. In an embodiment, the display module may be assembled with at least any one of the touch circuitry or sensor circuitry of the input module 140, and may be implemented as a touch screen. The audio module may output information in a sound form. For example, the audio module may include at least any one of a speaker or a receiver.

The driving module 160 may operate for an operation of the electronic device 100. According to one embodiment, if the electronic device 100 is an autonomous vehicle, the driving module 160 may include various parts. According to another embodiment, if the electronic device 100 is mounted on a vehicle to implement an autonomous vehicle, the driving module 160 may be connected to various parts of the vehicle. Accordingly, the driving module 160 may operate while controlling at least any one of the parts. For example, the parts may include at least any one of an engine module, an acceleration module, a braking module, a steering module or a navigation module.

The memory 170 may store at least any one of a program or data used by at least any one of the components of the electronic device 100. For example, the memory 170 may include at least any one of a volatile memory or a non-volatile memory.

The processor 180 may control the components of the electronic device 100 by executing a program of the memory 170, and may perform data processing or operations. The processor 180 may detect prediction data ($Y_{final}$) from input data X using a preset recursive network 200. In this case, each of the input data X and the prediction data ($Y_{final}$) may be time-series data. To this end, the processor 180 may include the recursive network 200, such as that illustrated in FIG. 2. In this case, the recursive network 200 may predict first prediction data ($Y_{initial}$) having a second time interval based on the input data X having a first time interval. Furthermore, the recursive network 200 may predict second prediction data ($Y_{final}$) having a third time interval based on the input data and the first prediction data ($Y_{initial}$). Accordingly, the processor 180 may detect the second prediction data ($Y_{final}$) as substantial prediction data ($Y_{final}$). In this case, the first time interval may be the same as or different from the second time interval and the third time interval. The second time interval may be the same as or different from the third time interval. Accordingly, the processor 180 may control the driving of the electronic device 100 using the second prediction data ($Y_{final}$).

According to an embodiment, as illustrated in FIG. 2(a), the recursive network 200 may be implemented in a form in which an external recurrence structure is coupled to an internal recurrence structure. The input data X may be input to the recursive network 200. The recursive network 200 may detect the first prediction data ($Y_{initial}$) based on the input data X through the internal recurrence structure. Furthermore, the first prediction data ($Y_{initial}$) may be input to the recursive network 200 through the external recurrence structure. Accordingly, the recursive network 200 may detect the second prediction data ($Y_{final}$) based on the input data X and the first prediction data ($Y_{initial}$).

According to another embodiment, as illustrated in FIG. 2(b), the recursive network 200 may be implemented in a form in which internal recurrence structures are coupled. The input data X may be input to a first internal recurrence structure of the recursive network 200. The recursive network 200 may detect the first prediction data ($Y_{initial}$) based on the input data X through the first internal recurrence structure. Furthermore, the input data X and the first prediction data ($Y_{initial}$) may be input to a second internal recurrence structure of the recursive network 200. The recursive network 200 may detect the second prediction data ($Y_{final}$) based on the input data X and the first prediction data ($Y_{initial}$) through the second internal recurrence structure.

For example, the electronic device 100 may be related to a vehicle 300. For example, the electronic device 100 may be the vehicle 300, that is, an autonomous vehicle. For another example, the electronic device 100 may be mounted on the vehicle 300 to implement an autonomous vehicle. In this case, surrounding objects may be surrounding vehicles 301 of the electronic device 100. For example, the surrounding vehicles 301 may travel at their speeds, and at least any one of the surrounding vehicles 301 may be stopping. In such a case, as illustrated in FIG. 3, the processor 180 may detect prediction data ($Y_{final}$) for the surrounding vehicles 301 based on input data X for the surrounding vehicles 301 using the recursive network 200. The input data X may include moving trajectories of the surrounding vehicles 301. Furthermore, the prediction data ($Y_{final}$) may include future trajectories of the surrounding vehicles 301. For example, the processor 180 may predict future trajectories of the surrounding vehicles 301 for five seconds based on moving trajectories of the surrounding vehicles 301 for three seconds.

The processor 180 may check moving trajectories of the surrounding vehicles 301. The processor 180 may collect information on a surrounding situation of the electronic device 100. In this case, the processor 180 may collect information on the surrounding situation of the electronic device 100 based on at least one of image data obtained through the camera module 120 or sensing data obtained through the sensor module 130. For example, the information on a surrounding situation may include a longitudinal location, lateral location, longitudinal speed, and lateral speed of each surrounding vehicle 301, a distance from the center of a lane, a lane number of each surrounding vehicle 301 on the basis of the vehicle 300. Accordingly, the processor 180 may check moving trajectories of the surrounding vehicles 301 based on the information on a surrounding situation of the electronic device 100. That is, the moving trajectories of the surrounding vehicles 301 may be detected as the input data X. In this case, the input data X may be time-series data.

The processor 180 may predict primary future trajectories of the surrounding vehicles 301 based on moving trajectories of the surrounding vehicles 301 using the recursive network 200. In this case, the primary future trajectories of the surrounding vehicles 301 may indicate an interaction between the surrounding vehicles 301. Accordingly, the primary future trajectories of the surrounding vehicles 301 may be detected as first prediction data ($Y_{initial}$). In this case, the first prediction data ($Y_{initial}$) may be time-series data. For example, the processor 180 may predict primary future trajectories of the surrounding vehicles 301 for five seconds based on moving trajectories of the surrounding vehicles 301 for three seconds.

The processor 180 may predict the final future trajectories of the surrounding vehicles 301 based on the moving trajectories of the surrounding vehicles 301 and the primary future trajectories of the surrounding vehicles 301 using the recursive network 200. That is, the processor 180 may detect the final future trajectories of the surrounding vehicles 301 by updating the primary future trajectories of the surrounding vehicles 301. Accordingly, the final future trajectories of the surrounding vehicles 301 may be detected as the second prediction data ($Y_{final}$). In this case, the second prediction data ($Y_{final}$) may be time-series data. For example, the processor 180 may predict the final future trajectories of the surrounding vehicles 301 for five seconds based on moving trajectories of the surrounding vehicles 301 for three seconds and primary future trajectories of the surrounding vehicles 301 for five seconds.

Accordingly, the processor 180 may control the driving of the vehicle 300 based on the future trajectories of the surrounding vehicles 301. At this time, the processor 180 may predict driving trajectories of the surrounding vehicles 301 for the vehicle 300. Furthermore, the processor 180 may control the driving of the vehicle 300 based on a driving trajectory of the electronic device 100. In this case, the processor 180 may control the driving module 160 based on the driving trajectory.

Figure 4:
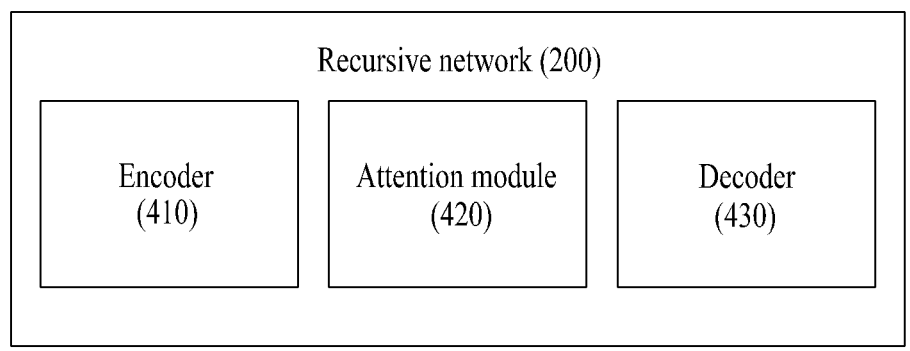
FIG. 4 is a diagram illustrating an internal configuration of the recursive network according to various embodiments.
Figure 5:
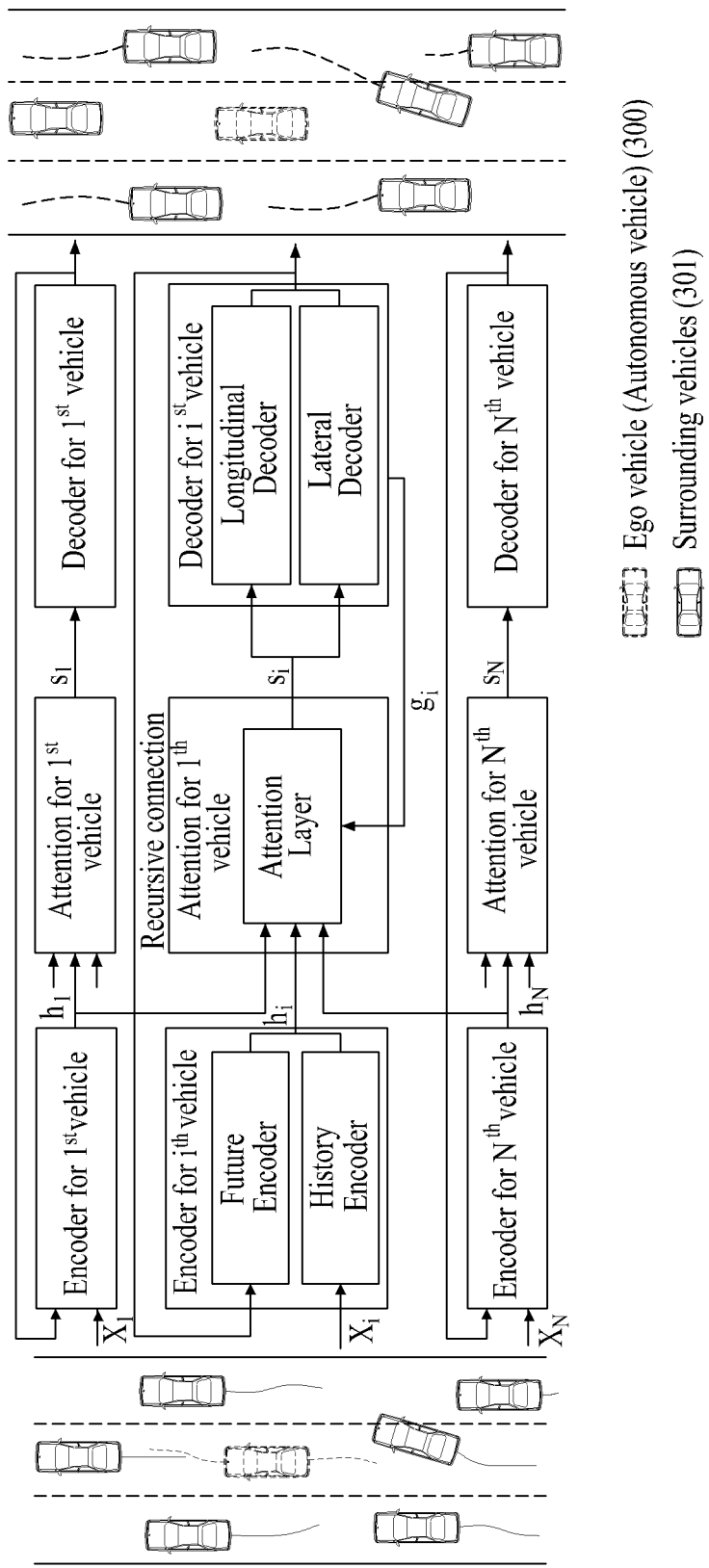
FIG. 5 is a diagram illustrating an internal configuration of the recursive network.
Figure 6:
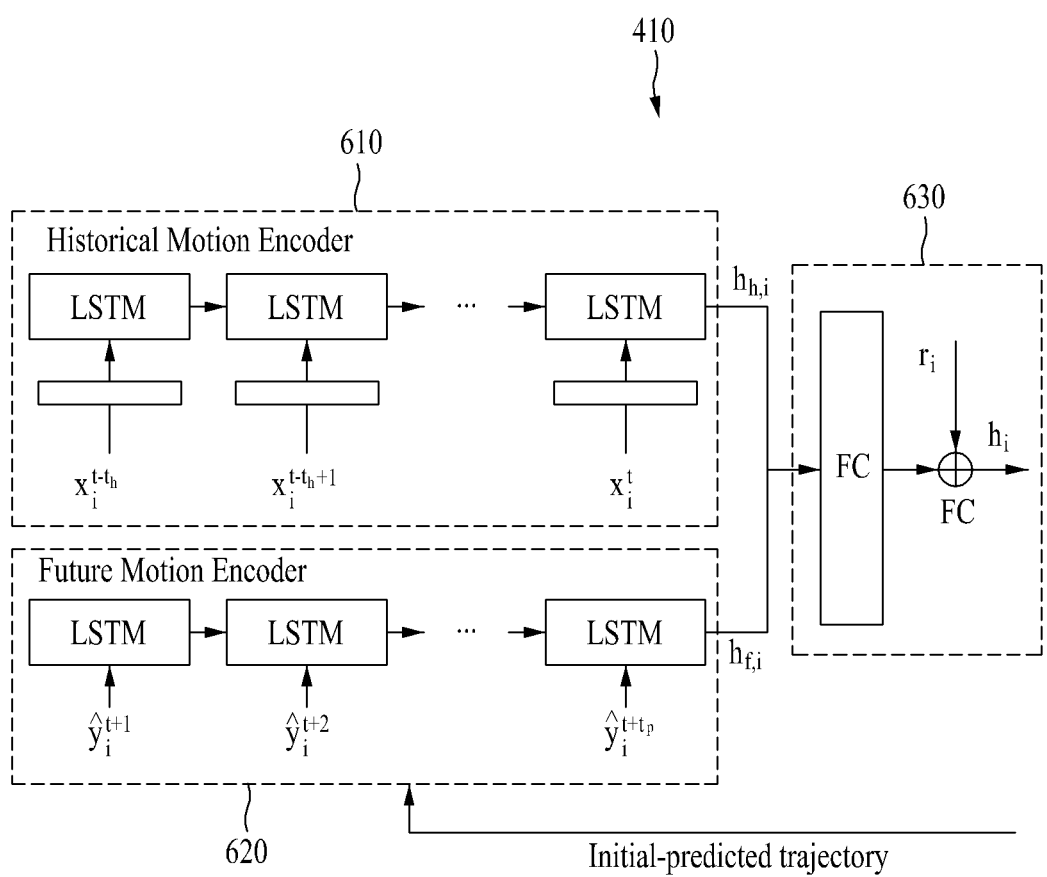
FIG. 6 is a diagram illustrating a detailed configuration of an encoder in FIG. 4.
Figure 7:
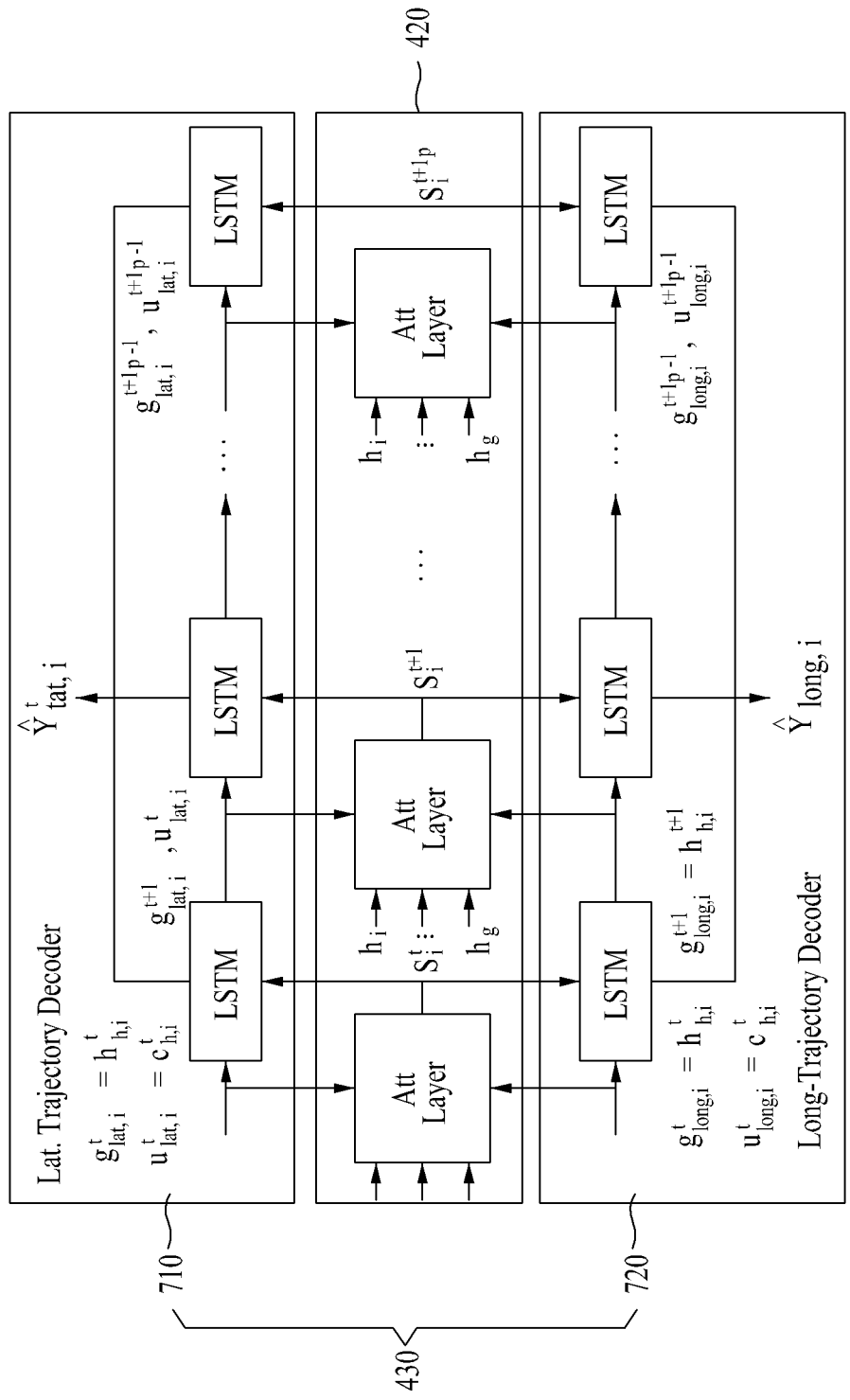
FIGS. 7 and 8 are diagrams illustrating detailed configurations of an attention module and a decoder in FIG. 4.
Figure 8:
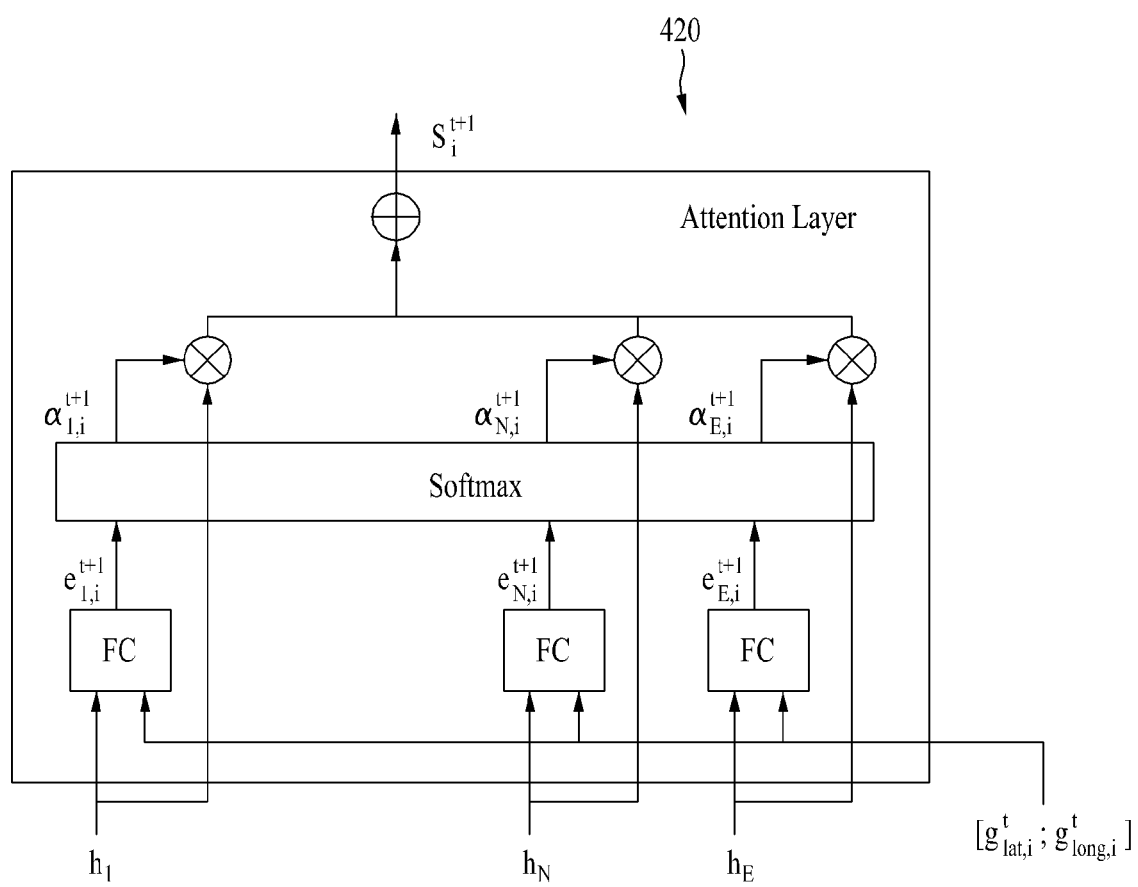

FIG. 4 is a diagram illustrating an internal configuration of the recursive network 200 according to various embodiments. FIG. 5 is a diagram illustrating an internal configuration of the recursive network 200. FIG. 6 is a diagram illustrating a detailed configuration of an encoder 410 in FIG. 4. FIGS. 7 and 8 are diagrams illustrating detailed configurations of an attention module 420 and a decoder 430 in FIG. 4.

Referring to FIG. 4, the recursive network 200 according to various embodiments may include at least one of at least one encoder 410, at least one attention module 420 or at least one decoder 430. In an embodiment, at least any one of the components of the recursive network 200 may be omitted, or one or more other components may be added to the recursive network 200.

For example, the electronic device 100 may be related to the vehicle 300. For example, the electronic device 100 may be the vehicle 300, that is, an autonomous vehicle. For another example, the electronic device 100 may be mounted on the vehicle 300 to implement an autonomous vehicle. In this case, the recursive network 200 may include a plurality of encoders 410, a plurality of attention modules 420, and a plurality of decoders 430. In such a case, as illustrated in FIG. 5, at least some of the encoders 410, at least some of the attention modules 420, and at least some of the decoders 430 may be activated in accordance with the number of surrounding vehicles 301. In this case, any one of the encoders 410, any one of the attention modules 420, and any one of the decoders 430 may operate with respect to one surrounding vehicle 301.

The encoder 410 may detect a feature vector ($h_{h,i}$, $h_{f,i}$) based on at least one of input data (X; $x_i$) or first prediction data ($Y_{initial}$; $\hat{y}_i$). In this case, the encoder 410 may extract hidden state information and memory cell state information based on at least one of the input data (X; $x_i$) or the first prediction data ($Y_{initial}$; $\hat{y}_i$), and may detect the feature vector ($h_{h,i}$, $h_{f,i}$) based on the hidden state information and the memory cell state information. In this case, as illustrated in FIG. 6, the encoder 410 may include at least one of a first encoder 610, a second encoder 620 or a coupling module 630. In some embodiments, the second encoder 620 may include the coupling module 630. The first encoder 610 may detect a first feature vector ($h_{h,i}$) based on the input data (X; $x_i$) having a first time interval. For example, the first encoder 610 may include a plurality of recurrent neural networks (RNN). For example, each of the RNNs may be a long short-term memory (LSTM) network. Each of the RNNs may process input data at each piece of timing within the first time interval. The second encoder 620 may detect a second feature vector ($h_{f,i}$) based on the first prediction data ($Y_{initial}$; $\hat{y}_i$) having a second time interval. For example, the second encoder 620 may include a plurality of RNNs. For example, each of the RNNs may be an LSTM network. Each of the RNNs may process the first prediction data ($Y_{initial}$; $\hat{y}_i$) at each piece of timing within the second time interval. The coupling module 630 may couple the first feature vector ($h_{h,i}$) and the second feature vector ($h_{f,i}$). In this case, the coupling module 630 may couple the first feature vector ($h_{h,i}$) and the second feature vector ($h_{f,i}$) using a fully connected (FC) layer. In this case, the coupling module 630 may generate a third feature vector ($h_i$) by coupling the first feature vector ($h_{h,i}$) and the second feature vector ($h_{f,i}$). For example, the encoder 410 may detect each of the feature vectors ($h_{h,i}$, $h_{f,i}$, and $h_i$) of all the surrounding vehicles 310. The attention module 420 may calculate importance ($\alpha_i$) of the feature vector ($h_i$) detected by the encoder 410. The importance ($\alpha_i$) may be obtained by digitizing, as a relative value, a degree that a corresponding feature vector ($h_i$) has an influence on generating a result model, that is, the first prediction data ($Y_{initial}$; $\hat{y}_i$) or the second prediction data ($Y_{final}$). For example, as illustrated in FIGS. 7 and 8, the attention module 420 may calculate the importance ($\alpha_i$) of each feature vector ($h_i$) based on the feature vectors ($h_i$) of all the surrounding vehicles 310. In this case, the attention module 420 may calculate the importance ($\alpha_i$) of each feature vector ($h_i$) between the feature vectors ($h_i$) using at least any one of the FC layer or a softmax function. Furthermore, as illustrated in FIGS. 7 and 8, the attention module 420 may multiply the feature vector ($h_i$) and the importance ($\alpha_i$), and may transmit a multiplication result ($s_i$) to the decoder 430. In this case, in a first internal recurrence, when a first feature vector ($h_i^1$) is received from the encoder 410, the attention module 420 may calculate importance ($\alpha_i^1$) of the first feature vector ($h_i^1$), and may multiply the first feature vector ($h_i^1$) and the importance ($\alpha_i^1$). In an n-t internal recurrence, when a third feature vector ($h_i^n$) is received from the encoder 410, the attention module 420 may calculate importance ($\alpha_i^n$) of the third feature vector ($h_i^n$), and may multiply the third feature vector ($h_i^n$) and the importance ($\alpha_i^n$).

The decoder 430 may output at least one of first prediction data ($Y_{initial}$; $\hat{y}_i$) or second prediction data ($Y_{final}$; $\hat{y}_i$) using the feature vectors ($h_i$), based on the importance ($\alpha_i$) calculated by the attention module 420. In this case, the decoder 430 may output at least one of the first prediction data ($Y_{initial}$; $\hat{y}_i$) or the second prediction data ($Y_{final}$; $\hat{y}_i$), based on the hidden state information and memory cell state information extracted by the encoder 410 and the multiplication result ($s_i$) calculated by the attention module 420. For example, as illustrated in FIG. 7, the decoder 430 may detect at least one of the first prediction data ($Y_{initial}$; $\hat{y}_i$) or the second prediction data ($Y_{final}$; $\hat{y}_i$) based on the multiplication result ($s_i$) for all the surrounding vehicles 310. In this case, in the first internal recurrence, when a multiplication result ($s_i^1$) of a third feature vector ($h_i^1$) and importance ($\alpha_i^1$) is received from the attention module 420, the decoder 430 may detect the first prediction data ($Y_{initial}$; $\hat{y}_i$). In the n-t internal recurrence, when a multiplication result ($s_i^n$) of a third feature vector ($h_i^n$) and importance ($\alpha_i^n$) is received from the attention module 420, the decoder 430 may detect the second prediction data ($Y_{final}$; $\hat{y}_i$). For example, as illustrated in FIG. 7, the decoder 430 may include at least one of a first decoder 710 or a second decoder 720. The first decoder 710 may detect a lateral movement of each surrounding vehicle 310. The second decoder 720 may detect a longitudinal movement of each surrounding vehicle 310. Accordingly, the decoder 430 may generate the first prediction data ($Y_{initial}$; $\hat{y}_i$) or the second prediction data ($Y_{final}$; $\hat{y}_i$) by combining the lateral movement and longitudinal movement of each surrounding vehicle 310.

Figure 9:
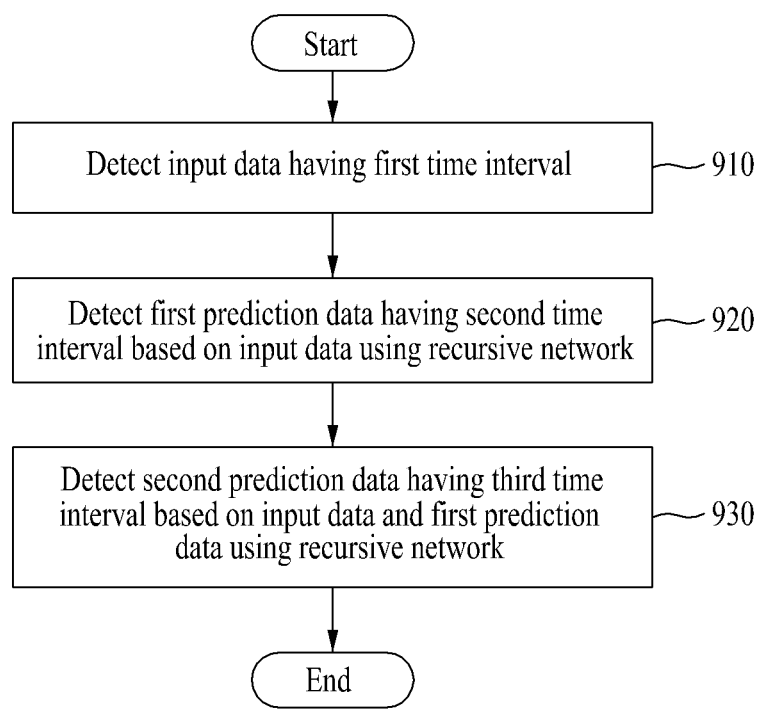
FIG. 9 is a diagram illustrating an operating method of the electronic device according to various embodiments.

FIG. 9 is a diagram illustrating an operating method of the electronic device 100 according to various embodiments.

Referring to FIG. 9, at operation 910, the electronic device 100 may detect input data X. In this case, the input data X may be time-series data. The processor 180 may detect the input data X having a first time interval. For example, the electronic device 100 may be related to the vehicle 300. In such a case, the processor 180 may check moving trajectories of the surrounding vehicles 301. The processor 180 may collect information on a surrounding situation of the electronic device 100. In this case, the processor 180 may collect the information on a surrounding situation of the electronic device 100, based on at least one of image data obtained through the camera module 120 or sensing data obtained through the sensor module 130. Accordingly, the processor 180 may check moving the trajectories of the surrounding vehicles 301 based on the information on a surrounding situation of the electronic device 100. That is, the moving trajectories of the surrounding vehicles 301 may be detected as the input data X.

At operation 920, the electronic device 100 may detect first prediction data ($Y_{initial}$) based on the input data X using the recursive network 200. In this case, the first prediction data ($Y_{initial}$) may be time-series data. The processor 180 may detect the first prediction data ($Y_{initial}$) having a second time interval using the recursive network 200. In this case, the second time interval may be the same as or different from the first time interval. For example, the electronic device 100 may be related to the vehicle 300. In such a case, the processor 180 may predict primary future trajectories of the surrounding vehicles 301 based on the moving trajectories of the surrounding vehicles 301 using the recursive network 200. That is, the primary future trajectories of the surrounding vehicles 301 may be detected as the first prediction data ($Y_{initial}$).

At operation 930, the electronic device 100 may detect second prediction data ($Y_{final}$) having a third time interval based on the input data X and the first prediction data ($Y_{initial}$) using the recursive network 200. In this case, the second prediction data ($Y_{final}$) may be time-series data. The processor 180 may detect the second prediction data ($Y_{final}$) having the third time interval using the recursive network 200. In this case, the third time interval may be the same as or different from the second time interval. For example, the electronic device 100 may be related to the vehicle 300. In such a case, the processor 180 may predict the final future trajectories of the surrounding vehicles 301 based on the moving trajectories of the surrounding vehicles 301 and the primary future trajectories of the surrounding vehicles 301 using the recursive network 200. That is, the processor 180 may detect the final future trajectories of the surrounding vehicles 301 by updating the primary future trajectories of the surrounding vehicles 301. That is, the final future trajectories of the surrounding vehicles 301 may be detected as the second prediction data ($Y_{final}$).

In an embodiment, the electronic device 100 may repeat operation 930 (n−1) times. That is, after performing operation 920 once, the electronic device 100 may repeat operation 930 (n−1) times. In this case, the processor 180 may update the first prediction data ($Y_{initial}$) with the second prediction data ($Y_{final}$), and may detect the second prediction data ($Y_{final}$) having the third time interval, based on the input data X and the updated first prediction data ($Y_{initial}$). The processor 180 may detect the second prediction data ($Y_{final}$) having the third time interval using the recursive network 200. Accordingly, the processor 180 may detect the final future trajectories of the surrounding vehicles 301 as the second prediction data ($Y_{final}$) detected at an (n−1) position.

Accordingly, the processor 180 may control the driving of the electronic device 100 by using the second prediction data ($Y_{final}$). For example, the electronic device 100 may be related to the vehicle 300. In such a case, the processor 180 may control the driving of the vehicle 300 by using the final future trajectories of the surrounding vehicles 301. At this time, the processor 180 may predict a driving trajectory of the vehicle 300. Furthermore, the processor 180 may control the driving of the vehicle 300 based on the driving trajectory of the electronic device 100. In this case, the processor 180 may control the driving module 160 based on the driving trajectory.

Figure 10:
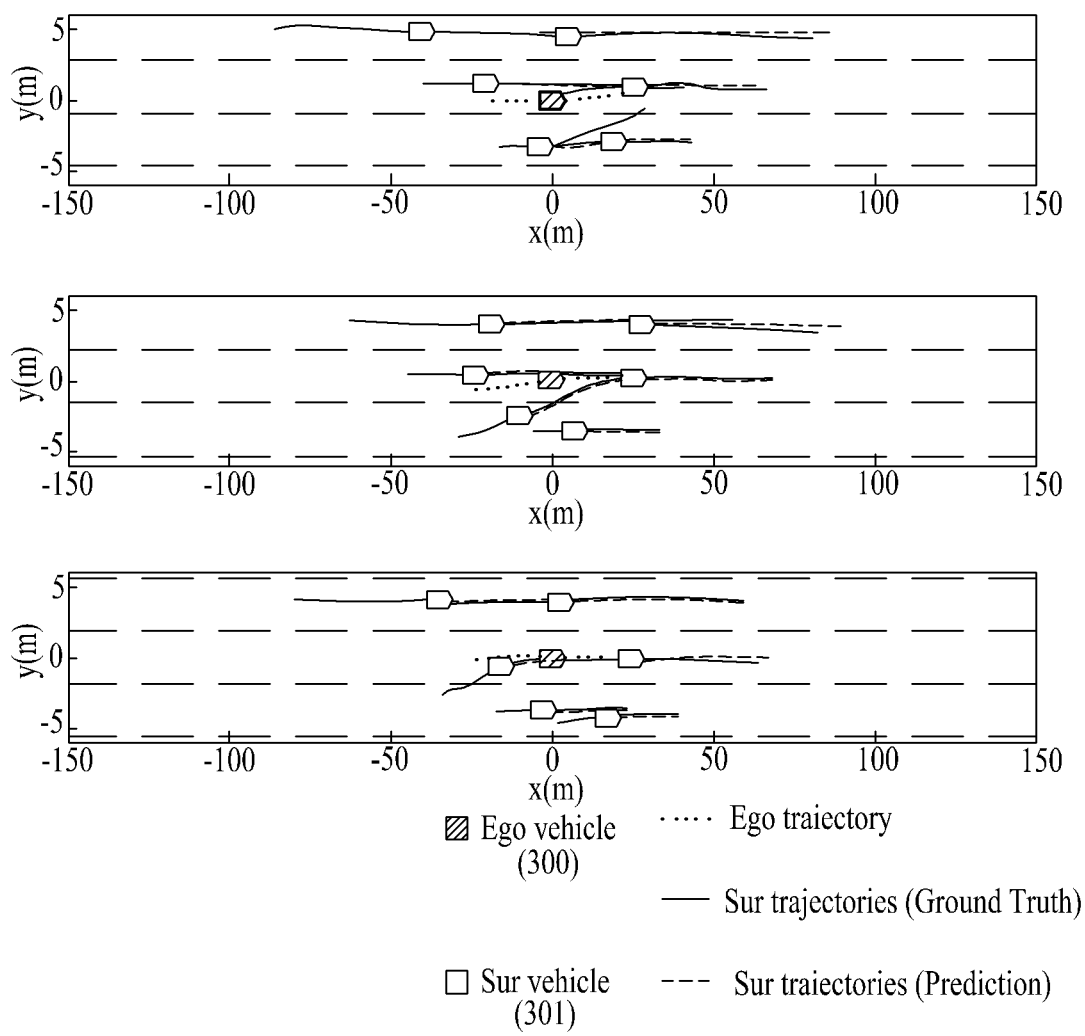
FIGS. 10 and 11 are diagrams for describing operating effects of the electronic device according to various embodiments.
Figure 11:
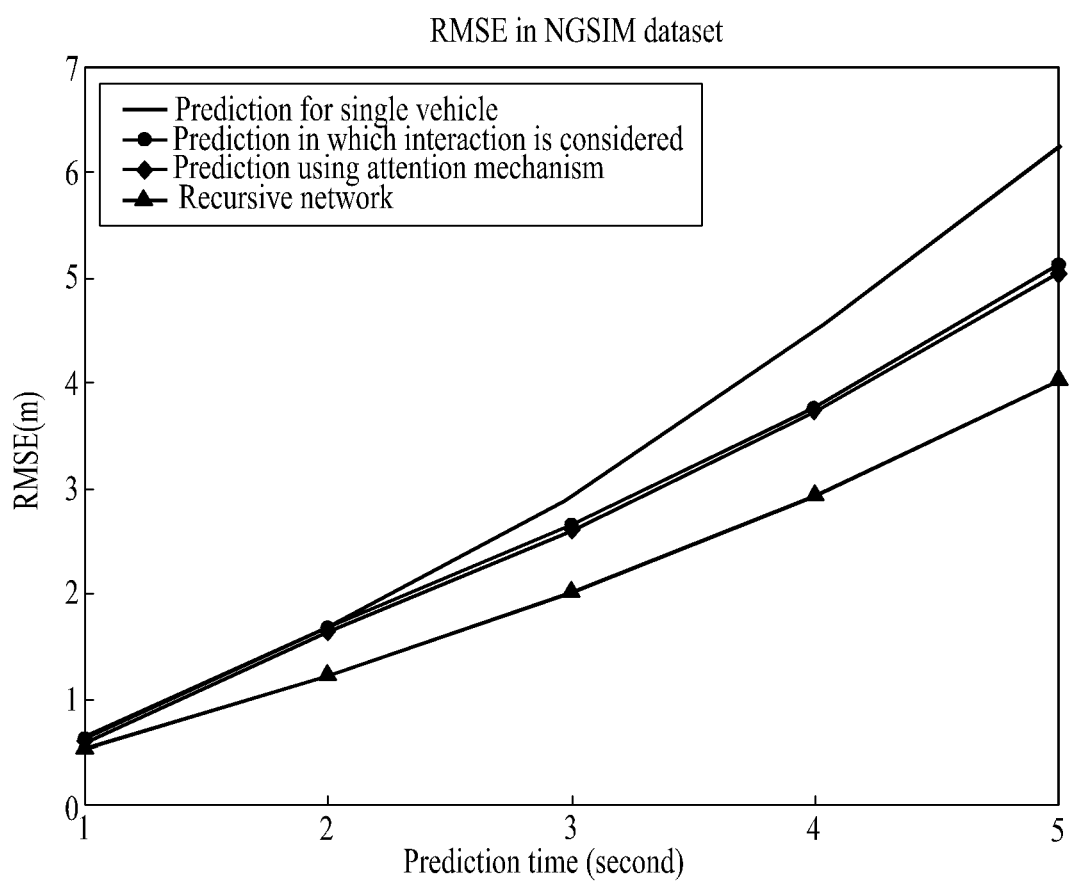

FIGS. 10 and 11 are diagrams for describing operating effects of the electronic device 100 according to various embodiments.

Referring to FIGS. 10 and 11, the accuracy of the final prediction data ($Y_{final}$) detected in the electronic device 100 using the recursive network 200 is high. In order to verify the accuracy, the electronic device 100 was mounted on the vehicle 300. The electronic device 100 predicts future trajectories of the surrounding vehicles 301 using the recursive network 200. Furthermore, the electronic device 100 measured actual moving trajectories of the surrounding vehicles 301. Accordingly, the electronic device 100 compared the future trajectories and actual moving trajectories of the surrounding vehicles 301. As a result of the comparison, the future trajectories and actual moving trajectories of the surrounding vehicles 301 were almost identical. As illustrated in FIG. 10, the electronic device 100 predicted a lane change situation for the surrounding vehicles 301 in addition to a common lane maintenance situation. Accordingly, the electronic device 100 may accurately predict a driving trajectory of the vehicle 300 based on the future trajectories of the surrounding vehicles 301. In this case, the electronic device 100 may accurately predict a driving trajectory of the vehicle 300 in various driving environments, including a crossway, in addition to a driving environment, such as an expressway.

According to various embodiments, the electronic device 100 may detect the final prediction data ($Y_{final}$) based on the input data X in various fields using the recursive network 200. That is, the electronic device 100 may detect the final prediction data ($Y_{final}$) based on the input data X and the primary prediction data ($Y_{initial}$) according to a future interaction. For example, various fields may include a machine translation field, an image (image/video) caption field, and a voice recognition field in addition to the aforementioned field related to the vehicle 300.

Figure 12:
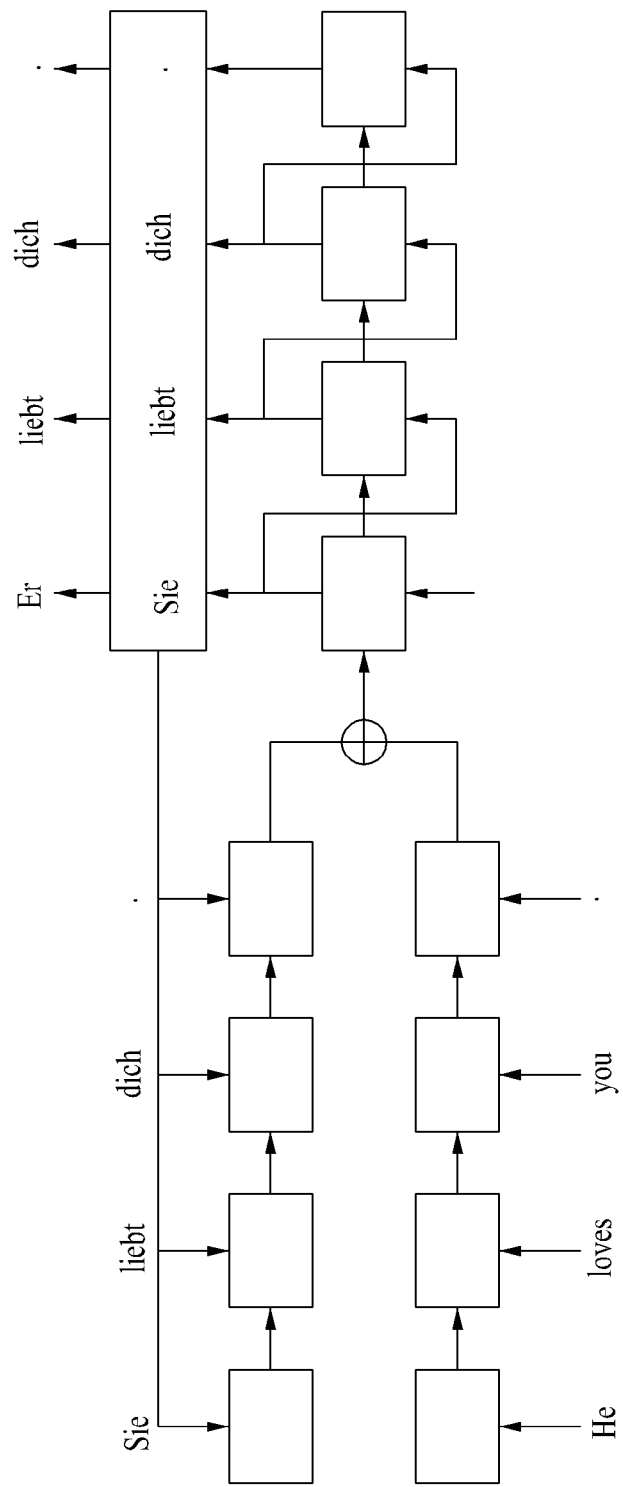
FIG. 12 is a diagram for describing illustrative operational characteristics of the recursive network.

FIG. 12 is a diagram for describing illustrative operational characteristics of the recursive network 200.

Referring to FIG. 12, the electronic device 100 may perform machine translation using the recursive network 200. In this case, the recursive network 200 may detect first prediction data ($Y_{initial}$), for example, a German sentence "Sie liebt dich." (translated into "She loves you." in English) based on input data X, for example, an English sentence "He loves you." Furthermore, the recursive network 200 may detect second prediction data ($Y_{final}$), for example, a German sentence "Er liebt dich" (translated into "He loves you." in English) based on the input data X and the first prediction data ($Y_{initial}$). Accordingly, the accuracy of the final prediction data ($Y_{final}$) detected in the electronic device 100 using the recursive network 200 is high.

According to various embodiments, the electronic device 100 may detect the final prediction data ($Y_{final}$) based on the primary prediction data ($Y_{initial}$), detected based on the input data X, in addition to the input data X using the recursive network 200. Accordingly, the electronic device can improve the accuracy of the final prediction data.

For example, if the electronic device 100 is related to the vehicle 300, the electronic device 100 may predict the final future trajectories of the surrounding vehicles 301 based on moving trajectories of the surrounding vehicles 301 and primary future trajectories of the surrounding vehicles 301 predicted based on the moving trajectories. That is, the electronic device 100 can more accurately predict the final future trajectories of the surrounding vehicles 301 by considering an interaction between the surrounding vehicles 301. Furthermore, the electronic device 100 can more accurately predict a driving trajectory of a vehicle based on the final future trajectories of the surrounding vehicles 301. Accordingly, the electronic device 100 can secure the safety of the vehicle 300.

An operating method of the electronic device 100 according to various embodiments may include an operation of detecting input data X having a first time interval, an operation of detecting first prediction data ($Y_{initial}$) having a second time interval based on the input data X using the preset recursive network 200, and an operation of detecting second prediction data ($Y_{final}$) having a third time interval based on the input data X and the first prediction data ($Y_{initial}$) using the recursive network 200.

According to various embodiments, the recursive network 200 may include the encoder 410 configured to detect each of a plurality of feature vectors ($h_{h,i}$, $h_{f,i}$, $h_i$) based on at least one of input data (X; $x_i$) or first prediction data ($Y_{initial}$; $\hat{y}_i$), the attention module 420 configured to calculate each of pieces of importance ($\alpha_i$) of the feature vectors ($h_i$) by calculating the importance ($\alpha_i$) of each feature vector ($h_i$) between the feature vectors ($h_{h,i}$, $h_{f,i}$, $h_i$), and the decoder 430 configured to output at least any one of the first prediction data ($Y_{initial}$; $\hat{y}_i$) or the second prediction data ($Y_{final}$; $\hat{y}_i$) using the feature vectors ($h_i$) based on the pieces of importance ($\alpha_i$).

According to various embodiments, each of the pieces of importance ($\alpha_i$) may indicate a degree that each of the feature vectors ($h_{h,i}$, $h_{f,i}$, $h_i$) has an influence on generating the first prediction data or the second prediction data.

According to various embodiments, the encoder 410 may include the first encoder 610 configured to detect first feature vectors ($h_{h,i}$) based on input data (X; $x_i$), the second encoder 620 configured to detect each of second feature vectors ($h_{f,i}$) based on first prediction data ($Y_{initial}$; $\hat{y}_i$) when the first prediction data ($Y_{initial}$; $\hat{y}_i$) is received from the decoder 430, and the coupling module 630 configured to couple each of the first feature vectors ($h_{h,i}$) and each of the second feature vectors ($h_{f,i}$) when all of the first feature vectors ($h_{h,i}$) and the second feature vectors ($h_{f,i}$) are detected.

According to various embodiments, the first time interval may indicate the past time interval. The second time interval and the third time interval may indicate future time intervals. At least two of the first time interval, the second time interval or the third time interval may be the same as or different from each other.

According to various embodiments, the encoder 410 may include a plurality of RNNs.

According to various embodiments, the attention module 420 may transmit a multiplication result ($s_i$) of each of the feature vectors ($h_i$) and each of the pieces of importance ($\alpha_i$) to the decoder 430.

According to various embodiments, the decoder 430 may include a plurality of RNNs.

According to various embodiments, the electronic device 100 may be mounted on the vehicle 300, or may be the vehicle 300. The input data X may include a moving trajectory of the surrounding vehicle 301. The first prediction data ($Y_{initial}$) may include the future trajectory of the surrounding vehicle 301.

According to various embodiments, the detecting of the second prediction data ($Y_{final}$) may include updating the future trajectory based on the moving trajectory and future trajectory of the surrounding vehicle 301 using the recursive network 200.

According to various embodiments, the operating method of the electronic device 100 may further include an operation of controlling the driving of the vehicle 300 based on the second prediction data ($Y_{final}$).

The electronic device 100 according to various embodiments may include the memory 170, and the processor 180 connected to the memory 170 and configured to execute at least one instruction stored in the memory 170.

According to various embodiments, the processor 180 may be configured to detect input data X having a first time interval, detect first prediction data ($Y_{initial}$) having a second time interval based on the input data X using the preset recursive network 200, and detect second prediction data ($Y_{final}$) having a third time interval based on the input data X and the first prediction data ($Y_{initial}$) using the recursive network 200.

According to various embodiments, the recursive network 200 may include the encoder 410 configured to detect each of a plurality of feature vectors ($h_{h,i}$, $h_{f,i}$, $h_i$) based on at least one of input data (X; $x_i$) or first prediction data ($Y_{initial}$; $\hat{y}_i$), the attention module 420 configured to calculate each of pieces of importance ($\alpha_i$) of the feature vectors ($h_i$) by calculating the importance ($\alpha_i$) of each feature vector ($h_i$) between the feature vectors ($h_{h,i}$, $h_{f,i}$, $h_i$), and the decoder 430 configured to output at least any one of the first prediction data ($Y_{initial}$; $\hat{y}_i$) or the second prediction data ($Y_{final}$; $\hat{y}_i$) using the feature vectors ($h_i$) based on the pieces of importance ($\alpha_i$).

According to various embodiments, each of the pieces of importance ($\alpha_i$) may indicate a degree that each of the feature vectors ($h_{h,i}$, $h_{f,i}$, $h_i$) has an influence on generating the first prediction data or the second prediction data.

According to various embodiments, the encoder 410 may include the first encoder 610 configured to detect first feature vectors ($h_{h,i}$) based on input data (X; $x_i$), the second encoder 620 configured to detect each of second feature vectors ($h_{f,i}$) based on first prediction data ($Y_{initial}$; $\hat{y}_i$) when the first prediction data ($Y_{initial}$; $\hat{y}_i$) is received from the decoder 430, and the coupling module 630 configured to couple each of the first feature vectors ($h_{h,i}$) and each of the second feature vectors ($h_{f,i}$) when all of the first feature vectors ($h_{h,i}$) and the second feature vectors ($h_{f,i}$) are detected.

According to various embodiments, the first time interval may indicate the past time interval. The second time interval and the third time interval may indicate future time intervals. At least two of the first time interval, the second time interval or the third time interval may be the same as or different from each other.

According to various embodiments, the encoder 410 may include a plurality of RNNs.

According to various embodiments, the attention module 420 may transmit a multiplication result ($s_i$) of each of the feature vectors ($h_i$) and each of the pieces of importance ($\alpha_i$) to the decoder 430.

According to various embodiments, the decoder 430 may include a plurality of RNNs.

According to various embodiments, the electronic device 100 may be mounted on the vehicle 300, or may be the vehicle 300. The input data X may include a moving trajectory of the surrounding vehicle 301. The first prediction data ($Y_{initial}$) may include the future trajectory of the surrounding vehicle 301.

According to various embodiments, the processor 180 may be configured to update the future trajectory based on the moving trajectory and future trajectory of the surrounding vehicle 301 using the recursive network 200 and to output the updated future trajectory as the second prediction data ($Y_{final}$).

According to various embodiments, the processor 180 may be configured to control the driving of the vehicle 300 based on the second prediction data ($Y_{final}$).

Various embodiments of this document may be implemented as a computer program including one or more instructions stored in a storage medium (e.g., the memory 170) readable by a computer device (e.g., the electronic device 100). For example, a processor (e.g., the processor 180) of the computer device may invoke at least one of the one or more instructions stored in the storage medium, and may execute the instruction. This enables the computer device to operate to perform at least one function based on the invoked at least one instruction. The one or more instructions may include a code generated by a compiler or a code executable by an interpreter. The storage medium readable by the computer device may be provided in the form of a non-transitory storage medium. In this case, the term "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

A computer program according to various embodiments may execute an operation of detecting input data X having a first time interval, an operation of detecting first prediction data ($Y_{initial}$) having a second time interval based on the input data X using the preset recursive network 200, and an operation of detecting second prediction data ($Y_{final}$) having a third time interval based on the input data X and the first prediction data ($Y_{initial}$) using the recursive network 200.

According to various embodiments, the recursive network 200 may include the encoder 410 configured to detect each of a plurality of feature vectors ($h_{h,i}$, $h_{f,i}$, $h_i$) based on at least one of input data (X; $x_i$) or first prediction data ($Y_{initial}$; $\hat{y}_i$), the attention module 420 configured to calculate each of pieces of importance ($\alpha_i$) of the feature vectors ($h_i$) by calculating the importance ($\alpha_i$) of each feature vector ($h_i$) between the feature vectors ($h_{h,i}$, $h_{f,i}$, $h_i$), and the decoder 430 configured to output at least any one of the first prediction data ($Y_{initial}$; $\hat{y}_i$) or the second prediction data ($Y_{final}$; $\hat{y}_i$) using the feature vectors ($h_i$) based on the pieces of importance ($\alpha_i$).

According to various embodiments, each of the pieces of importance ($\alpha_i$) may indicate a degree that each of the feature vectors ($h_{h,i}$, $h_{f,i}$, $h_i$) has an influence on generating the first prediction data or the second prediction data.

The embodiments of this document and the terms used in the embodiments are not intended to limit the technology described in this document to a specific embodiment, but should be construed as including various changes, equivalents and/or alternatives of a corresponding embodiment. In the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" and "the second", may modify corresponding components regardless of their sequence or importance, and are used to only distinguish one component from the other component and do not limit corresponding components. When it is described that one (e.g., first) component is "(functionally or communicatively) connected to" or "coupled with" the other (e.g., second) component, the one component may be directly connected to the other component or may be connected to the other component through another component (e.g., third component).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

According to various embodiments, each (e.g., module or program) of the described components may include a single entity or a plurality of entities. According to various embodiments, one or more of the aforementioned components or operations may be omitted or one or more other components or operations may be added. Alternatively or additionally, a plurality of components (e.g., modules or programs) may be integrated into one component. In such a case, the integrated components may perform one or more functions of each of a plurality of components identically with or similar to that performed by a corresponding one of the plurality of components before the components are integrated. According to various embodiments, other components performed by a module, an operation or another program may be executed sequentially, in parallel, repeatedly or heuristically, or one or more of the operations may be executed in different order or may be omitted, or one or more other operations may be added.

According to various embodiments, the electronic device can detect final prediction data based on primary prediction data, detected based on input data, in addition to the input data using the recursive network. Accordingly, the electronic device can improve the accuracy of the final prediction data.

For example, if the electronic device is related to a vehicle, the electronic device can predict the final future trajectories of surrounding vehicles based on moving trajectories of the surrounding vehicles and primary future trajectories predicted based on the moving trajectories. That is, the electronic device can more accurately predict the final future trajectories of the surrounding vehicles by considering an interaction between the surrounding vehicles. Furthermore, the electronic device can more accurately predict a driving trajectory of the vehicle based on the final future trajectories of the surrounding vehicles. Accordingly, the electronic device can secure the safety of the vehicle.

The embodiments of the invention in which an exclusive property or privilege is claimed are defined as follows:

1. An operating method of an electronic device, comprising:
    detecting input data for a first time interval indicating a past time interval;
    detecting first prediction data for a second time interval indicating a future time interval based on the input data using a preset recursive network;
        detecting second prediction data for the second time interval indicating the future time interval based on the input data for the first time interval and the first prediction data for the second time interval using the recursive network;
    controlling a driving of the vehicle based on the second prediction data; and
    wherein:
        the electronic device is mounted on a vehicle or is a vehicle;
        the input data comprises a moving trajectory of a surrounding vehicle for a first period of time,
        the first prediction data comprises a future trajectory of the surrounding vehicle for a second period of time longer than the first period of time; and
        the detecting of the second prediction data comprises updating the future trajectory based on the moving trajectory and future trajectory of the surrounding vehicle using the recursive network.

2. The operating method of claim 1, wherein the recursive network comprises:
    an encoder configured to detect each of a plurality of feature vectors based on at least one of the input data or the first prediction data;
    an attention module configured to calculate each of the pieces of importance of the feature vectors by calculating the importance of each feature vector between the feature vectors; and
    a decoder configured to output at least one of the first prediction data or the second prediction data using the feature vectors based on the pieces of importance,
    wherein each of the pieces of importance indicates a degree that each of the feature vectors has an influence on generating the first prediction data or the second prediction data.

3. The operating method of claim 2, wherein the encoder comprises:
    a first encoder configured to detect each of first feature vectors based on the input data;
    a second encoder configured to detect each of second feature vectors based on the input data and the first prediction data when the first prediction data is output by the decoder; and
    a coupling module configured to couple each of the first feature vectors and each of the second feature vectors when all of the first feature vectors and the second feature vectors are detected.

4. The operating method of claim 2, wherein:
    the first time interval, and the second time interval are different from each other.

5. The operating method of claim 2, wherein the attention module transmits a multiplication result of each of the feature vectors and each of the pieces of importance to the decoder.

6. The operating method of claim 2, wherein at least any one of the encoder or the decoder comprises a plurality of recurrent neural networks (RNNs).

7. An electronic device comprising:
    a memory; and
    a processor connected to the memory and configured to execute at least one instruction stored in the memory,
    wherein the processor is configured to:
    detect input data for a first time interval indicating a past time interval,
    detect first prediction data for a second time interval indicating a future time interval based on the input data using a preset recursive network, and
        detect second prediction data for the second time interval indicating the future time interval based on the input data for the first time interval and the first prediction data for the second time interval using the recursive network; and
    wherein the electronic device is mounted on a vehicle or is a vehicle and is configured for controlling a driving of the vehicle based on the second prediction data; and
    wherein:
        the input data comprises a moving trajectory of a surrounding vehicle for a first period of time,
        the first prediction data comprises a future trajectory of the surrounding vehicle for a second period of time longer than the first period of time; and
        the detecting of the second prediction data comprises updating the future trajectory based on the moving trajectory and future trajectory of the surrounding vehicle using the recursive network.

8. The electronic device of claim 7, wherein the recursive network comprises:
an encoder configured to detect a plurality of feature vectors based on at least one of the input data or the first prediction data;
an attention module configured to calculate each of the pieces of importance of the feature vectors by calculating the importance of each feature vector between the feature vectors; and
a decoder configured to output at least one of the first prediction data or the second prediction data using the feature vectors based on the pieces of importance,
wherein each of the pieces of importance indicates a degree that each of the feature vectors has an influence on generating the first prediction data or the second prediction data.

9. The electronic device of claim 8, wherein the encoder comprises:
a first encoder configured to detect each of first feature vectors based on the input data;
a second encoder configured to detect each of second feature vectors based on the input data and the first prediction data when the first prediction data is output by the decoder; and
a coupling module configured to couple each of the first feature vectors and each of the second feature vectors when all of the first feature vectors and the second feature vectors are detected.

10. The electronic device of claim 8, wherein:
the first time interval, and the second time interval are different from each other.

11. The electronic device of claim 8, wherein the attention module transmits a multiplication result of each of the feature vectors and each of the pieces of importance to the decoder.

12. The electronic device of claim 8, wherein at least any one of the encoder or the decoder comprises a plurality of recurrent neural networks (RNNs).

13. A computer program stored in a storage medium coupled to a computer device and readable by the computer device,
wherein the computer program executes:
an operation of detecting input data for a first time interval indicating a past time interval;
an operation of detecting first prediction data for a second time interval indicating a future time interval based on the input data using a preset recursive network; and
an operation of detecting second prediction data for the second time interval indicating the future time interval based on the input data for the first time interval and the first prediction data for the second time interval using the recursive network; and
an operation of controlling a driving of a vehicle based on the second prediction data; and
wherein:
the input data comprises a moving trajectory of a surrounding vehicle for a first period of time,
the first prediction data comprises a future trajectory of the surrounding vehicle for a second period of time longer than the first period of time; and
the operation of detecting of the second prediction data comprises updating the future trajectory based on the moving trajectory and future trajectory of the surrounding vehicle using the recursive network.

14. The computer program of claim 13, wherein the recursive network comprises:
an encoder configured to detect each of a plurality of feature vectors based on at least one of the input data or the first prediction data;
an attention module configured to calculate each of the pieces of importance of the feature vectors by calculating the importance of each feature vector between the feature vectors; and
a decoder configured to output at least one of the first prediction data or the second prediction data using the feature vectors based on the pieces of importance,
wherein each of the pieces of importance indicates a degree that each of the feature vectors has an influence on generating the first prediction data or the second prediction data.

* * * * *